United States Patent
Andrews et al.

(10) Patent No.: US 10,391,837 B2
(45) Date of Patent: Aug. 27, 2019

(54) HEATING AND COOLING SYSTEMS AND METHODS FOR TRUCK CABS

(71) Applicant: Tiger Tool International Incorporated, Abbotsford (CA)

(72) Inventors: Michael Andrews, Bellingham, WA (US); Doddy Ervondy, Surrey (CA)

(73) Assignee: Tiger Tool International Incorporated, Abbotsford (CA)

( * ) Notice: Subject to any disclaimer, the term of this patent is extended or adjusted under 35 U.S.C. 154(b) by 0 days.

(21) Appl. No.: 15/936,747

(22) Filed: Mar. 27, 2018

(65) Prior Publication Data

US 2018/0215235 A1 Aug. 2, 2018

Related U.S. Application Data

(63) Continuation of application No. 14/642,601, filed on Mar. 9, 2015, now Pat. No. 9,925,847.

(60) Provisional application No. 61/950,719, filed on Mar. 10, 2014.

(51) Int. Cl.
*B60H 1/00* (2006.01)

(52) U.S. Cl.
CPC ..... *B60H 1/00921* (2013.01); *B60H 1/00378* (2013.01)

(58) Field of Classification Search
CPC .. B60H 1/00921; B60H 1/443; B60H 1/2215; B60H 1/2218; B60H 1/221; B60H 1/225
See application file for complete search history.

(56) References Cited

U.S. PATENT DOCUMENTS

| D240,428 S | 7/1976 | Hoffman |
| 4,280,330 A | 7/1981 | Harris et al. |
| 4,463,576 A | 8/1984 | Burnett et al. |

(Continued)

FOREIGN PATENT DOCUMENTS

| CN | 103363603 A | 10/2013 |
| CN | 106414122 A | 2/2017 |

(Continued)

OTHER PUBLICATIONS apucenter.com, Auxiliary Power Units—Service—Parts, Comfort Master, https://web.archive.org/web/20140111100715/http://apucenter.com/, Jan. 11, 2014, 2 pages.

(Continued)

*Primary Examiner* — Elizabeth J Martin
(74) *Attorney, Agent, or Firm* — Michael R. Schacht; Schacht Law Office, Inc.

(57) ABSTRACT

A vehicle heating and cooling system comprising an interior system, a compressor system, and primary working fluid configured to flow between the interior system and the compressor system, an auxiliary heating system, and at least one valve assembly. The auxiliary heating system comprises an auxiliary heat exchanger comprising at least one heating element and a voltage controller operatively connected between the vehicle battery and the at least one heating element. The at least one valve assembly configured to operate in a cooling mode, a standard heating mode, and an augmented heating mode in which the auxiliary heating system transfers heat from the at least one heating element to the primary working fluid.

12 Claims, 7 Drawing Sheets

(56) References Cited

U.S. PATENT DOCUMENTS

| | | | |
|---|---|---|---|
| 4,602,485 A | 7/1986 | Fujimoto et al. | |
| D287,264 S | 12/1986 | Rinaldo et al. | |
| 4,630,775 A | 12/1986 | Mandon et al. | |
| 4,825,663 A | 5/1989 | Nijjar et al. | |
| 4,947,657 A | 8/1990 | Kalmbach | |
| D322,122 S | 12/1991 | Guetersloh et al. | |
| D324,420 S | 3/1992 | Farce | |
| D338,952 S | 8/1993 | Snow | |
| D393,703 S | 4/1998 | Gilbertson | |
| 5,808,441 A | 9/1998 | Nehring | |
| 5,896,750 A | 4/1999 | Karl | |
| 6,116,513 A | 9/2000 | Perhats | |
| 6,158,230 A | 12/2000 | Katsuki | |
| D453,560 S | 2/2002 | Van Brunt | |
| D456,887 S | 5/2002 | Zlotnik | |
| 6,460,356 B1 | 10/2002 | Tao et al. | |
| 6,615,602 B2 | 9/2003 | Wilkinson | |
| D532,893 S | 11/2006 | Wu | |
| D536,078 S | 1/2007 | Leon | |
| D536,079 S | 1/2007 | Leon | |
| D548,750 S | 8/2007 | Neeley et al. | |
| D575,381 S | 8/2008 | Leon | |
| 7,430,874 B2 | 10/2008 | Prince et al. | |
| 7,448,227 B2 | 11/2008 | Zeigler et al. | |
| D630,310 S | 1/2011 | Beland et al. | |
| D631,145 S | 1/2011 | Beland et al. | |
| D644,320 S | 8/2011 | Virr et al. | |
| D647,192 S | 10/2011 | Esteve et al. | |
| D648,018 S | 11/2011 | Sordo | |
| D663,816 S | 7/2012 | Tebe Poves et al. | |
| 8,468,843 B2 | 6/2013 | Futernik et al. | |
| D698,431 S | 1/2014 | Garbusi et al. | |
| D723,674 S | 3/2015 | Zaari | |
| D755,943 S | 5/2016 | Lanssky | |
| D762,830 S | 8/2016 | Lewis | |
| D763,423 S | 8/2016 | Hewett et al. | |
| D766,414 S | 9/2016 | Chu | |
| D778,415 S | 2/2017 | Ogg | |
| D801,500 S | 10/2017 | Andrews | |
| D801,501 S | 10/2017 | Andrews | |
| 9,925,847 B2 | 3/2018 | Andrews et al. | |
| 2003/0098148 A1 | 5/2003 | Mehraban et al. | |
| 2003/0192952 A1 | 10/2003 | Horn et al. | |
| 2003/0217559 A1* | 11/2003 | Ieda | B60H 1/00428 62/230 |
| 2004/0025525 A1 | 2/2004 | Kubo et al. | |
| 2005/0044864 A1 | 3/2005 | Manole et al. | |
| 2005/0241818 A1 | 11/2005 | Yakumaru et al. | |
| 2006/0288713 A1 | 12/2006 | Knight et al. | |
| 2007/0204639 A1 | 9/2007 | Harrison | |
| 2009/0211280 A1* | 8/2009 | Alston | B60H 1/00428 62/231 |
| 2009/0293522 A1 | 12/2009 | Miyazaki | |
| 2010/0089563 A1 | 4/2010 | Sundhar et al. | |
| 2011/0067422 A1 | 3/2011 | Ichishi et al. | |
| 2011/0114405 A1 | 5/2011 | Perhats | |
| 2011/0209490 A1 | 9/2011 | Mijanovic et al. | |
| 2011/0302942 A1 | 12/2011 | Birchard | |
| 2013/0199217 A1 | 8/2013 | Arai et al. | |
| 2013/0227973 A1* | 9/2013 | Kang | F25B 47/022 62/80 |
| 2014/0007605 A1* | 1/2014 | Schneider | B60H 1/00385 62/238.7 |
| 2016/0288619 A1 | 10/2016 | Andrews | |
| 2017/0070065 A1 | 3/2017 | Weflen | |
| 2018/0266742 A1 | 9/2018 | Andrews | |

FOREIGN PATENT DOCUMENTS

| | | |
|---|---|---|
| EP | 3277529 A1 | 2/2018 |
| RU | 2146034 C1 | 2/2000 |
| RU | 2157037 C1 | 9/2000 |
| RU | 2425436 C2 | 7/2011 |
| RU | 2516912 C1 | 5/2014 |
| SU | 1558311 A3 | 4/1990 |
| WO | 2016161447 A1 | 10/2016 |
| WO | 2017132260 A1 | 8/2017 |
| WO | 2017197407 | 11/2017 |

OTHER PUBLICATIONS

Bergstrom, Bergstrom NITE No-Idle, https://web.archive.org/web/20140207093405/http://us.bergstrominc.com/nite-no-idle/, Feb. 7, 2014, 1 page.

ClimaCab Crosspoint Solutions, ClimaCab 3.0 APU, Product Overview and Brochure, http://www.crosspointsolutionsgroup.com/climacab/product/climacab-apu.html, 2012, 6 pages.

Cool-It, 12V No-Idle Split A/C System, Product Overview and Brochure, http://cool-it.ca/?s=12+volt+no+idle+system, 2012, 8 pages.

DC Airco, High Efficiency Direct Current Air Conditioners, https://web.archive.org/web/20130825041413/http://dcairco.com/index.php/products/trucks, Aug. 25, 2013, 3 pages.

Dometic Group, Dometic Showcases Expanded Line of HVAC Systems for Day Cabs, http://www.2.dometic.com/enus/Americas/USA/Truck-News/Dometic-Showcases-Expanded-Line-of-HVAC-Systems-For-Day-Cabs/, 2010, 1 page.

Hammond Air Conditioning Ltd., Arctic Breeze Truck AC: 12V/DC air conditioning keeps cabs cool without wasting fuel, https://web.archive.org/web/20140108111758/http://www.arcticbreeze-truckac.com/, Jan. 8, 2014, 1 page.

Idle Free Systems, Inc., Systems for all driving conditions, budgets, and investment timelines, http://idlefreesystems.com/no-idle-elimination-systems-battery-reffer-busses.html, 2010-2011, 1 page.

Indel B, Sleeping Well, https://web.archive.org/web/20130530064452/http://www.indelb.com/products/truck_air_conditioning/sleeping_well, May 30, 2013, 2 pages.

International Searching Authority, ISR & Written Opinion, PCT/US2015019523, dated Jun. 10, 2015, 7 pages.

International Searching Authority, ISR & Written Opinion, PCT/US2016/025923, dated Sep. 8, 2016, 7 pages.

International Searching Authority, ISR & Written Opinion, PCT/US2017/032750, dated Aug. 24, 2017, 7 pages.

International Searching Authority, Written Opinion & ISR, PCT/US2017/014941, dated Apr. 20, 2017, 7 pages.

Rigmaster Power, The Ultimate Stand-Alone Truck Mounted APU, http://rigmasterpower.com, 2011, 1 page.

Thermo King, APU Tripac Evolution, Product Overview and Brochure, http://www.na.thermoking.com/tk-innovation/global/en/products/apu.html, 2011, 9 pages.

USPTO, "Final Office Action, U.S. Appl. No. 15/047,442,", dated Feb. 14, 2018, 15 pages.

USPTO, "Non-Final Office Action, U.S. Appl. No. 15/047,442,", dated Aug. 10, 2017, 6 pages.

USPTO, "Non-Final Office Action, U.S. Appl. No. 14/642,601,", dated Jun. 16, 2017, 9 pages.

USPTO, "Non-Final Office Action, U.S. Appl. No. 15/090,455," dated Jan. 18, 2018, 29 pages.

State Intellectual Property Office of the People's Republic of China, "Notification of the First Office Action", Application No. 201580012907.2, dated Apr. 27, 2018, 8 pages.

USPTO, "Final Office Action, U.S. Appl. No. 15/090,455,", dated Aug. 30, 2018, 18 pages.

* cited by examiner

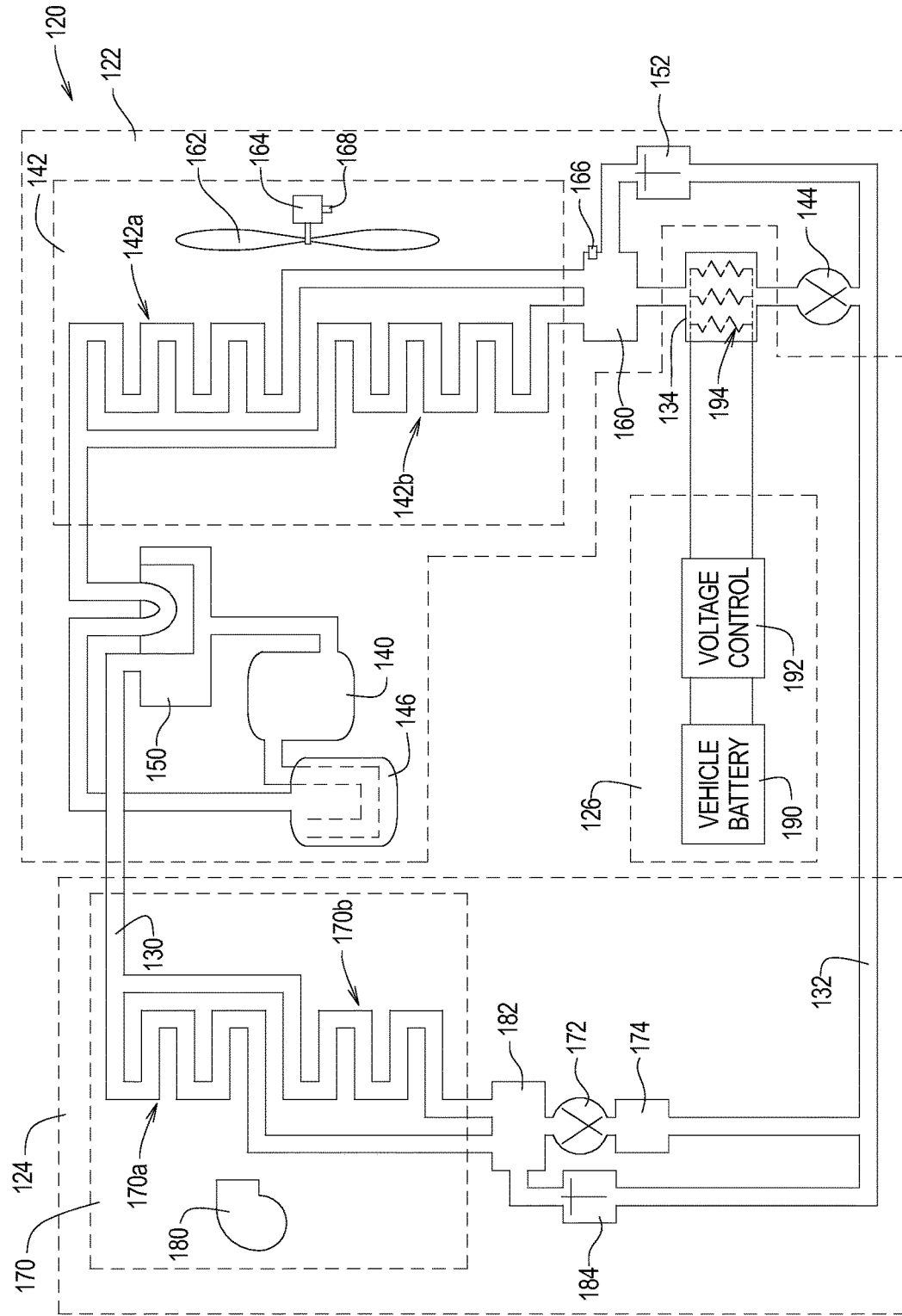

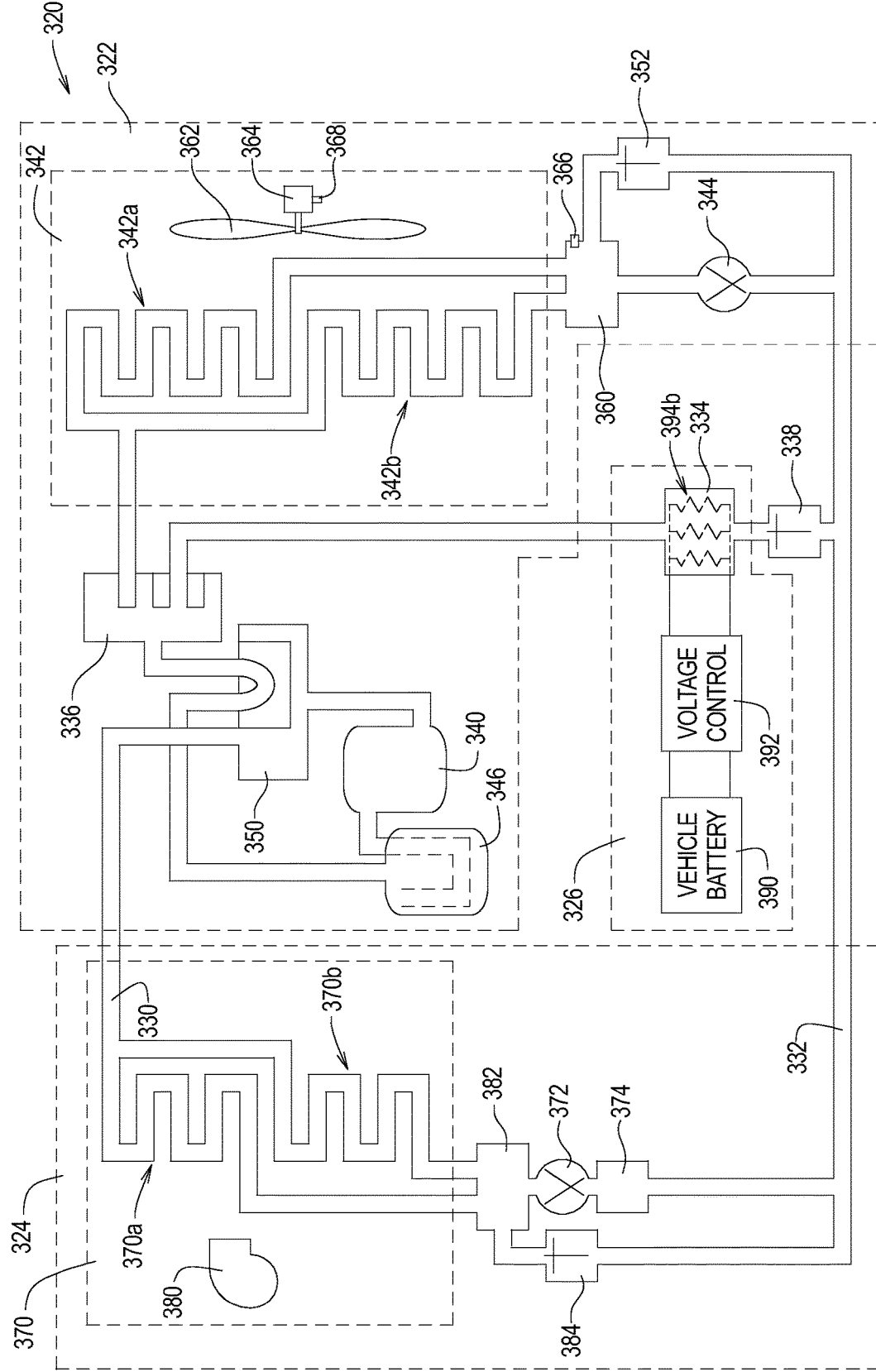

HEATING AND COOLING SYSTEMS AND METHODS FOR TRUCK CABS

RELATED APPLICATIONS

This application U.S. patent application Ser. No. 15/936,747 filed Mar. 27, 2018 is a continuation of U.S. patent application Ser. No. 14/642,601 filed Mar. 9, 2015, now U.S. Pat. No. 9,925,847 which issued on Mar. 27, 2018.

U.S. patent application Ser. No. 14/642,601 claims benefit of U.S. Provisional Application Ser. No. 61/950,719 filed Mar. 10, 2014.

The contents of all related applications are incorporated herein by reference.

TECHNICAL FIELD

The present invention relates to systems and methods for heating and cooling the interior of a vehicle and, more particularly, to vehicle heating and cooling systems and methods that employ a heat pump.

BACKGROUND

Utility power is typically made available as an AC power signal distributed from one or more centralized sources to end users over a power distribution network. However, utility power is unavailable for certain structures. For example, movable structures such vehicles do not have access to utility power when moving and can be connected to power distribution network when parked only with difficulty. Similarly, remote structures such as cabins and military installations not near the utility power distribution network often cannot be practically powered using utility power.

DC power systems including batteries are often employed to provide power when utility power is unavailable. For example, trucks and boats typically employ a DC power system including a battery array to provide power at least to secondary vehicle electronics systems such as communications systems, navigation systems, ignition systems, heating and cooling systems, and the like. Shipping containers and remote cabins that operate using alternative primary power sources such as solar panels or generators also may include DC power systems including a battery or array of batteries to operate electronics systems when primary power is unavailable. Accordingly, most modern vehicles and remote structures use battery power sufficient to operate, at least for a limited period of time, electronics systems such as secondary vehicle electronics systems.

The capacity of a battery system used by a vehicle or remote structure is typically limited by factors such as size, weight, and cost. For example, a vehicle with an internal combustion engine may include a relatively small battery for use when the engine is not operating; a large battery array is impractical for vehicles with an internal combustion engine because the size of the batteries takes up valuable space and the weight of the batteries reduces vehicle efficiency when the vehicle is being moved by the engine. All electric vehicles have significantly greater battery capacity, but that battery capacity is often considered essential for the primary purpose of moving the vehicle, so the amount of battery capacity that can be dedicated to secondary vehicle electronics systems is limited. Battery systems employed by remote structures must be capable of providing power when the alternative power source is unavailable, but factors such as cost, size, and weight reduce the overall power storage capacity of such systems.

Heating and cooling systems have substantial energy requirements. Vehicles such as trucks or boats typically rely on the availability of the internal combustion engine when heating or cooling is required. When heating or cooling is required when the vehicle is parked or the boat is moored for more than a couple of minutes, the internal combustion engine will be operated in an idle mode solely to provide power to the heating and cooling system. Engine idling is inefficient and creates unnecessary pollution, and anti-idling laws are being enacted to prevent the use of idling engines, especially in congested environments like cities, truck stops, and harbors. For remote structures such as cabins or shipping containers, heating and cooling systems can be a major draw on battery power. Typically, an alternative or inferior heating or cooling source such as a wood burning stove, fans, or the like are used instead of a DC powered heating and cooling system.

The need thus exists for heating and cooling systems using battery power having improved efficiency to optimize the use of battery power.

SUMMARY

The present invention may be embodied as a vehicle heating and cooling system for a vehicle comprising a vehicle battery, the vehicle heating and cooling system comprising an interior system, a compressor system, primary working fluid configured to flow between the interior system and the compressor system, an auxiliary heating system, and at least one valve assembly. The auxiliary heating system comprises an auxiliary heat exchanger comprising at least one heating element, where the auxiliary heat exchanger is operatively configured to transfer heat to the primary working fluid, and a voltage controller operatively connected between the vehicle battery and the at least one heating element to control flow of electricity from the battery to the at least one heating element to generate heat. The at least one valve assembly is configured to operate in a cooling mode in which the primary working fluid transfers heat from the interior system to the compressor system, a standard heating mode in which the primary working fluid transfers heat from the compressor system to the interior system and the auxiliary heating system does not transfer heat to the primary working fluid, and an augmented heating mode in which the auxiliary heating system transfers heat from the at least one heating element to the primary working fluid.

The present invention may also be embodied as a vehicle heating and cooling system for a vehicle comprising a vehicle battery, the vehicle heating and cooling system comprising an interior system, a compressor system, a primary working fluid, an auxiliary heating system, and at least one valve assembly. The interior system comprises an evaporator. The compressor system comprises a compressor and a condenser. The primary working fluid is configured to flow between the evaporator and the compressor. The auxiliary heating system comprises an auxiliary heat exchanger and a voltage controller. The auxiliary heat exchanger comprises at least one heating element and is operatively configured to transfer heat to the primary working fluid. The voltage controller is operatively connected between the vehicle battery and the at least one heating element to control flow of electricity from the battery to the at least one heating element to generate heat. The at least one valve assembly configured to operate in a cooling mode in which the primary working fluid transfers heat from the interior system to the compressor system, a standard heating mode in which in which the primary working fluid transfers heat from the compressor system to the interior system and the auxiliary heating system does not transfer heat to the primary working fluid, and an augmented heating mode in which the auxiliary heating system transfers heat from the at least one heating element to the primary working fluid.

BRIEF DESCRIPTION OF THE DRAWINGS

FIG. 2 is a schematic view of a second example vehicle heating and cooling system of the present invention;

FIG. 4B is a schematic view of the fourth example vehicle heating and cooling system of the present invention in a second mode.

DETAILED DESCRIPTION

The present invention may be embodied in a number of different example configurations, and several examples of vehicle heating and cooling systems constructed in accordance with, and embodying, the principles of the present invention will be described separately below.

I. First Example Heating and Cooling System

Figure 1:
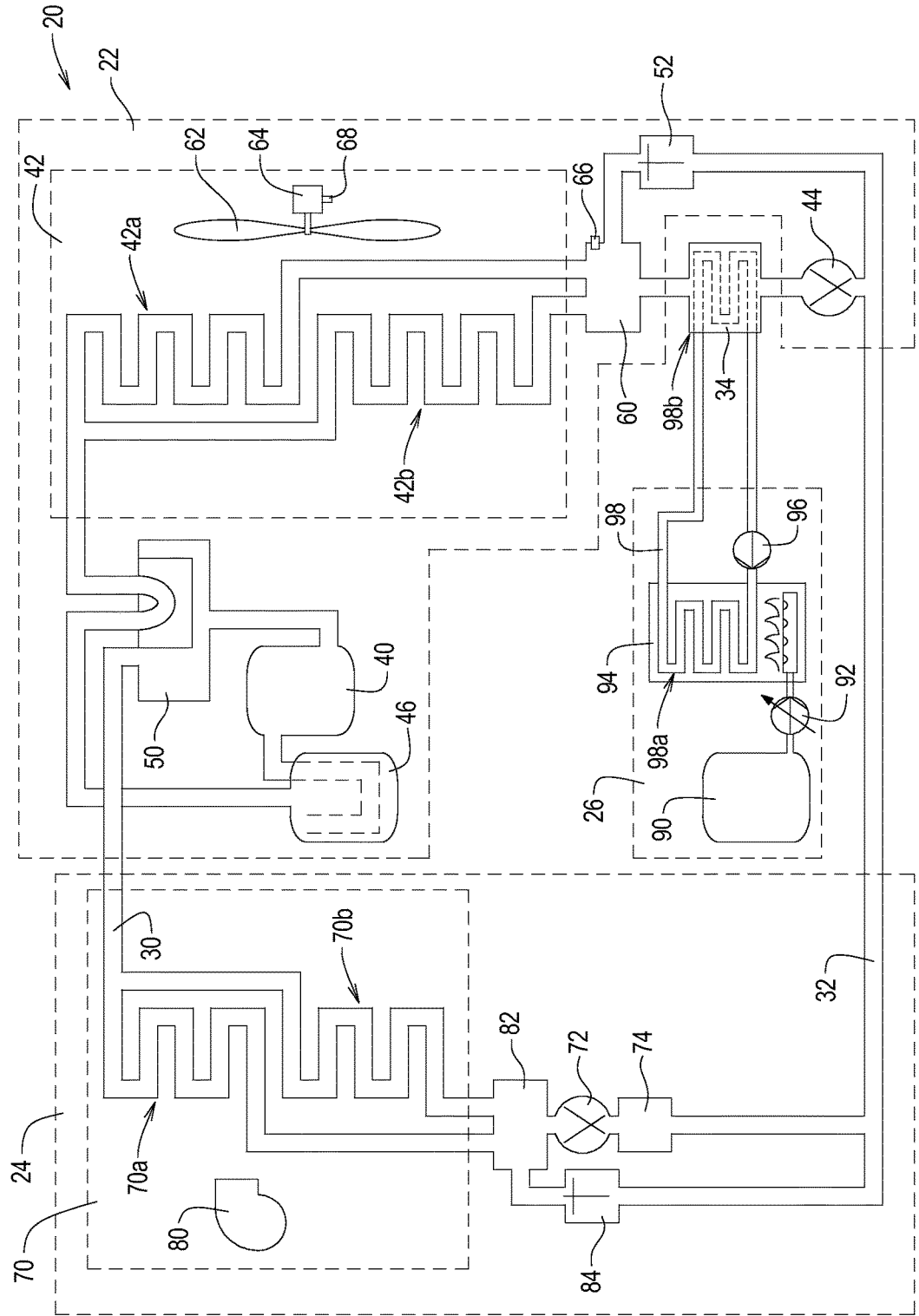
FIG. 1 is a schematic view of a first example vehicle heating and cooling system of the present invention.

Referring initially to FIG. 1 of the drawing, depicted therein is a first example vehicle heating and cooling system 20 of the present invention. The first example vehicle heating and cooling system 20 is capable of operating in a cooling mode and in a heating mode. In the cooling mode, heat is transferred from an interior A to an exterior B of a vehicle (not shown) on which the first example heating system 20 is mounted. In the heating mode, heat is transferred from the exterior B to an interior A of the vehicle on which the first example heating system 20 is mounted.

In this application, the term "vehicle" refers to a movable structure when that structure is not connected to utility power either when being moved or when stationary and having electronics systems that operate on vehicle (DC) power. Examples of vehicles include trucks, automobiles, shipping containers, and boats. The present is of particular significance when applied to vehicles but may also have application to any structure, whether fixed or movable, that does not have access to utility power at least a portion of the time and is designed to operate primarily on DC power. The term "remote structure" will be used herein to refer to such structures.

Figure 1A:
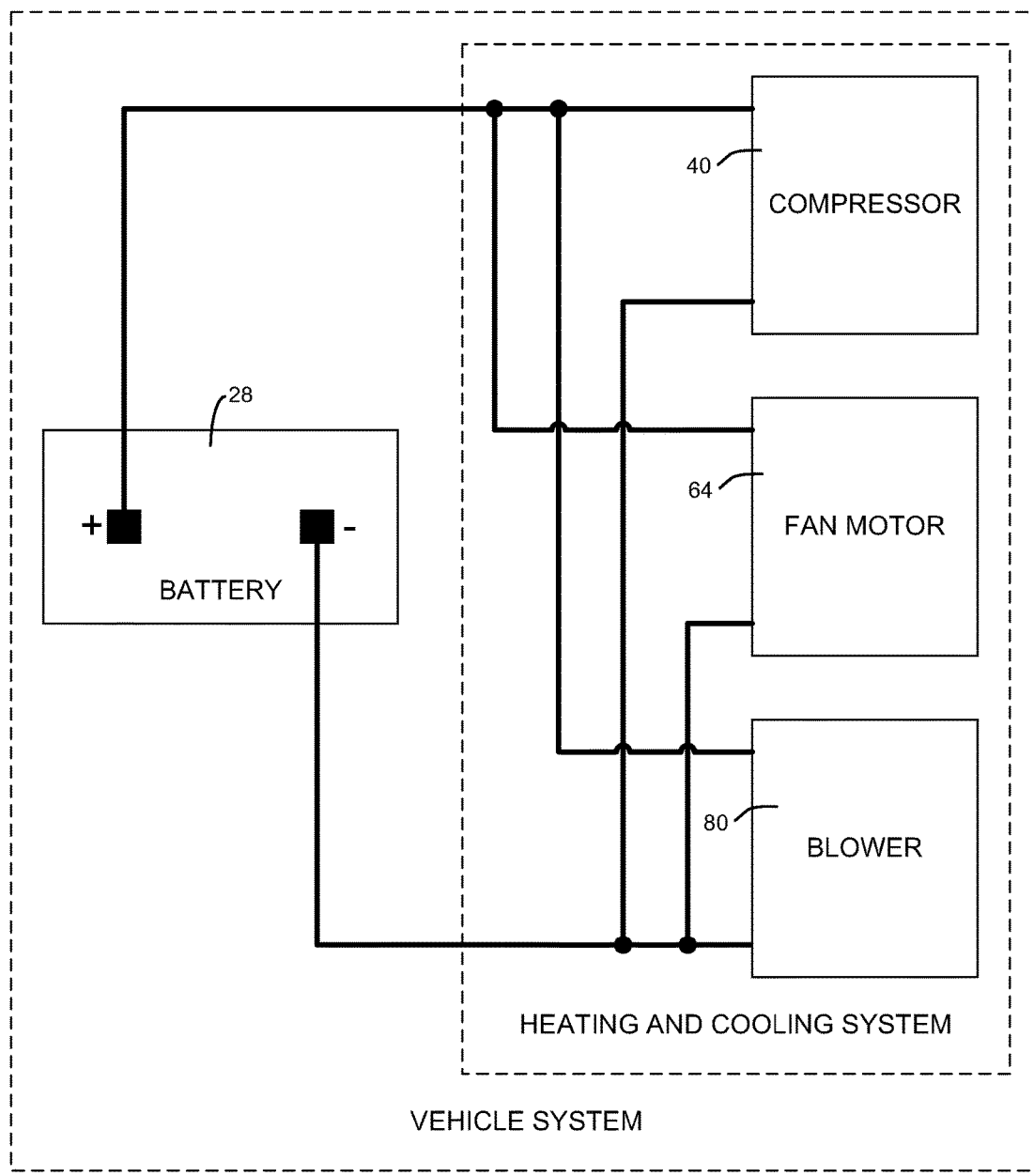
FIG. 1A is a block diagram illustrating the interconnection of the major components of the first example heating and cooling system to a battery.

The first example vehicle heating and cooling system 20 comprises a compressor system 22, an interior system 24, and an auxiliary system 26 as shown in FIG. 1 and is connected to a battery 28 mounted within the vehicle as generally shown in FIG. 1A. The compressor system 22 and the interior system 24 are connected together by a first main line 30 and a second main line 32. The first and second main lines 30 and 32 allow main working a to be circulated between the compressor system 22 and the interior system 24. The compressor system 22 and the auxiliary heating system 26 are connected together by an auxiliary heat exchanger 34 that allows heat generated by the auxiliary heating system 26 to be transferred to the main working fluid.

The compressor system 22 comprises a compressor 40, a compressor side heat exchanger or condenser 42, a compressor thermal expansion valve 44, and an accumulator 46. The example condenser 42 comprises a plurality of heat exchanger portions 42a and 42b. A reversing valve 50 and compressor check valve 52 allow the first example vehicle heating and cooling system 20 to operate in the cooling mode and in the heating mode. The compressor system 22 further comprises a compressor distributor 60, a compressor fan 62, a fan motor 64, a compressor fluid temperature sensor 66, and a motor switch 68. The compressor distributor 60 allows fluid to flow through the heat exchanger portions 42a and 42b in parallel. The compressor fan 62, fan motor 64, temperature sensor 66, and motor switch 68 operate the fan 62 based on temperature of the primary working fluid flowing between the compressor system 22 and the interior system 24.

The interior system 24 comprises an interior heat exchanger or evaporator 70, an interior thermal expansion valve 72, and a dryer 74. The example interior system 24 further comprises an interior blower 80, an interior distributor 82, and an interior check valve 84. The example evaporator 70 comprises a plurality of interior heat exchanger sections 70a and 70b. The interior blower 80 carries heat from the evaporator 70 into the interior A. In combination with the reversing valve 50 and compressor check valve 52, the interior distributor 82 and interior check valve 84 allow the first example vehicle heating and cooling system 20 to operate in the cooling mode and in the heating mode. The interior distributor 82 allows fluid to flow through the interior heat exchanger portions 70a and 70b in parallel.

In the cooling mode, the compressor system 22 and the interior system 24 operate in a conventional manner as generally described in U.S. Pat. No. 6,615,602 to Wilkinson, which is incorporated herein by reference. The operation of the first example heating and cooling system 20 in the cooling mode will thus not be described in detail herein.

In the heating mode, the first example heating and cooling system 20 may operate in both a standard heating mode and in an augmented heating mode. In the standard heating mode, the compressor system 22 and the interior system 24 operate in a conventional manner as generally described in the U.S. Pat. No. 6,615,602 patent. In the augmented heating mode, the heat generated by the compressor system 22 and transferred to the interior system 24 is augmented by the auxiliary heating system 26 as will now be described in detail.

In particular, the example auxiliary heating system 26 comprises a fuel tank 90, a fuel control valve 92, a boiler 94, an auxiliary fuel pump 96, and an auxiliary fluid line 98. The auxiliary fluid line 98 comprises a boiler section 98a and a heat exchanger section 98b. The boiler section 98a is located within the boiler 94, and the heat exchanger section 98b is located within the auxiliary heat exchanger 34.

The fuel tank 90 may be the main fuel tank of the vehicle on which the first example heating and cooling system 20 is mounted (e.g., diesel, gasoline) or may be a separate, auxiliary fuel tank containing the same or another type of fuel (e.g., propane). The fuel control valve 92 controls the flow of fuel from the fuel tank 90 to the boiler 94. The boiler 94 burns the fuel to create heat. The auxiliary fuel pump 96 circulates auxiliary fluid (e.g., water) through the burner section 98a and the heat exchanger section 98b of the auxiliary fluid line 98. Heat from the boiler 94 is transferred to the auxiliary fluid in the boiler section 98a. Heat from the auxiliary fluid is transferred to the main fluid in the auxiliary heat exchanger 34. The auxiliary heating system 26 thus may be used to transfer heat to the main fluid when environmental and vehicle operation considerations do not allow the compressor system 22 efficiently to extract sufficient heat from the ambient air flowing across the compressor heat exchanger 42.

II. Second Example Heating and Cooling System

Referring now to FIG. 2 of the drawing, depicted therein is a second example vehicle heating and cooling system 120 of the present invention. The second example vehicle heating and cooling system 120 is capable of operating in a cooling mode and in a heating mode. In the cooling mode, heat is transferred from an interior A to an exterior B of a vehicle (not shown) on which the second example heating system 120 is mounted. In the heating mode, heat is transferred from the exterior B to an interior A of the vehicle on which the second example heating and cooling system 120 is mounted. As with the first example heating and cooling system 20 described above with reference to FIG. 1A, at least a portion of the power consumed by a battery (not shown) of the vehicle system associated with the second example heating and cooling system 120.

The second example vehicle heating and cooling system 120 comprises a compressor system 122, an interior system 124, and an auxiliary system 126. The compressor system 122 and the interior system 124 are connected together by a first main line 130 and a second main line 132. The first and second main lines 130 and 132 allow main working fluid to be circulated between the compressor system 122 and the interior system 124. The compressor system 122 and the auxiliary heating system 126 are connected together by an auxiliary heat exchanger 134 that allows heat generated by the auxiliary heating system 126 to be transferred to the main working fluid.

The compressor system 122 comprises a compressor 140, a compressor heat exchanger 142, a compressor thermal expansion valve 144, and an accumulator 146. The example compressor heat exchange 142 comprises a plurality of heat exchanger portions 142a and 142b. A reversing valve 150 and compressor check valve 152 allow the second example vehicle heating and cooling system 120 to operate in the cooling mode and in the heating mode. The compressor system 122 further comprises a compressor distributor 160, a compressor fan 162, a fan motor 164, a compressor fluid temperature sensor 166, and a motor switch 168. The compressor distributor 160 allows fluid to flow through the heat exchanger portions 142a and 142b in parallel. The compressor fan 162, fan motor 164, temperature sensor 166, and motor switch 168 operate the fan 162 based on temperature of the primary working fluid flowing between the compressor system 122 and the interior system 124.

The interior system 124 comprises an interior heat exchanger 170, an interior thermal expansion valve 172, and a dryer 174. The example interior system 124 further comprises an interior blower 180, an interior distributor 182, and an interior check valve 184. The example interior heat exchanger 170 comprises a plurality of interior heat exchanger sections 170a and 170b. The interior blower 180 carries heat from the interior heat exchanger 170 into the interior A. In combination with the reversing valve 150 and compressor check valve 152, the interior distributor 182 and interior check valve 184 allow the second example vehicle heating and cooling system 120 to operate in the cooling mode and in the heating mode. The interior distributor 182 allows fluid to flow through the interior heat exchanger portions 170a and 170b in parallel.

In the cooling mode, the compressor system 122 and the interior system 124 operate in a conventional manner as generally described in the U.S. Pat. No. 6,615,602 patent, which is incorporated herein by reference. The operation of the second example heating and cooling system 120 in the cooling mode will thus not be described in detail herein.

In the heating mode, the second example heating and cooling system 120 may operate in both a standard heating mode and in an augmented heating mode. In the standard heating mode, the compressor system 122 and the interior system 124 operate in a conventional manner as generally described in the U.S. Pat. No. 6,615,602 patent. In the augmented heating mode, the heat generated by the compressor system 122 and transferred to the interior system 124 is augmented by the auxiliary heating system 126 as will now be described in detail.

In particular, the example auxiliary heating system 126 comprises a battery 190, a voltage controller 192, and heating elements 194. The heating elements 194 are arranged within the auxiliary heat exchanger 134. The battery 190 may be the main battery of the vehicle on which the second example heating and cooling system 120 is mounted (e.g., diesel, gasoline) or may be a separate, auxiliary battery dedicated for use with the auxiliary heating system 126.

The voltage controller 192 controls the flow of electricity from the battery 190 to the heating elements 194. The heating elements 194 are resistive elements that convert electricity into heat. Heat from the heating elements 194 is transferred to the main fluid in the auxiliary heat exchanger 134. The auxiliary heating system 126 thus may be used to transfer heat to the main fluid when environmental and vehicle operation considerations do not allow the compressor system 122 efficiently to extract sufficient heat from the ambient air flowing across the compressor heat exchanger 142.

III. Third Example Heating and Cooling System

Figure 3A:
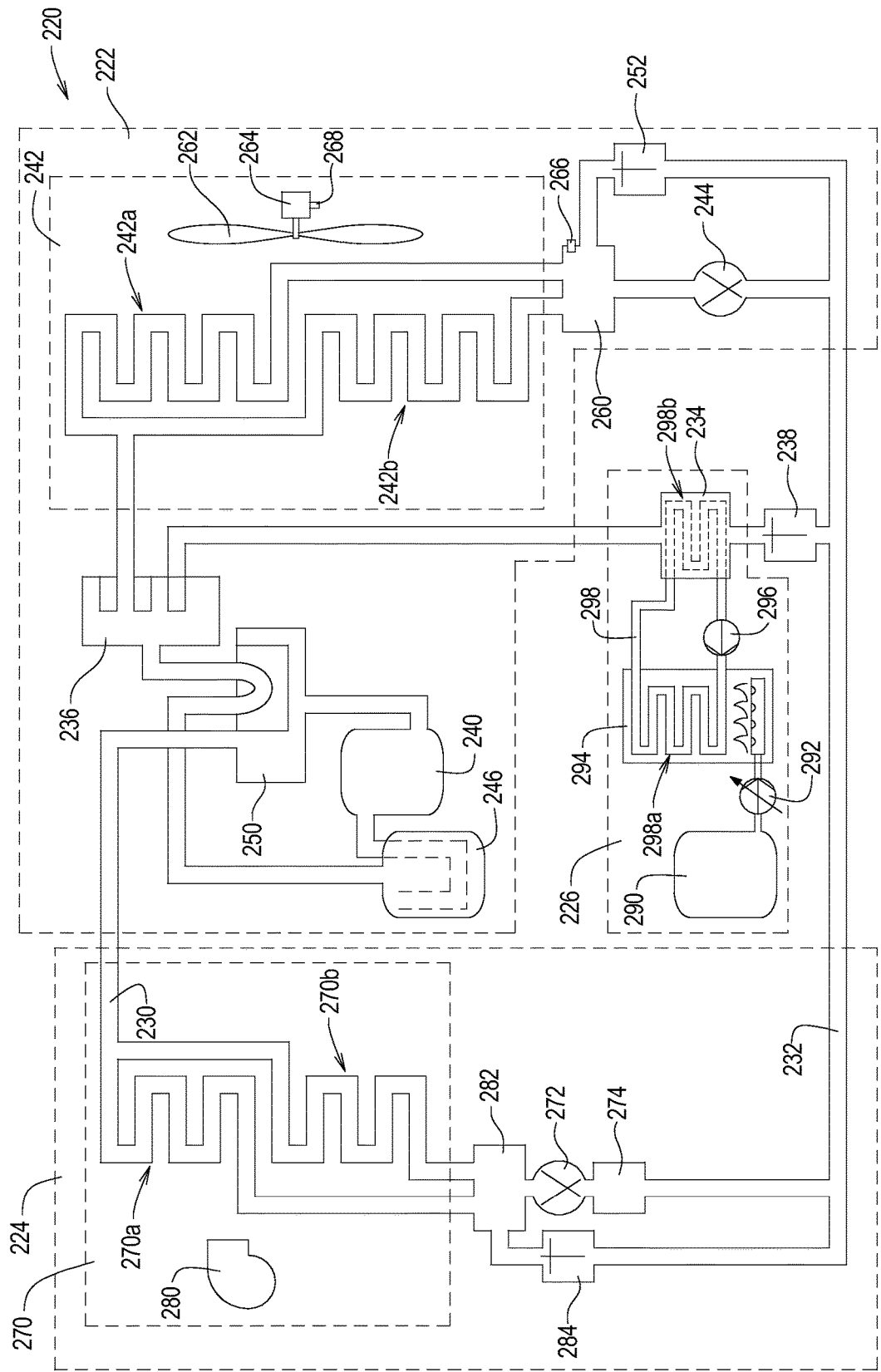
FIG. 3A is a schematic view of a third example vehicle heating and cooling system of the present invention in a first mode.
Figure 3B:
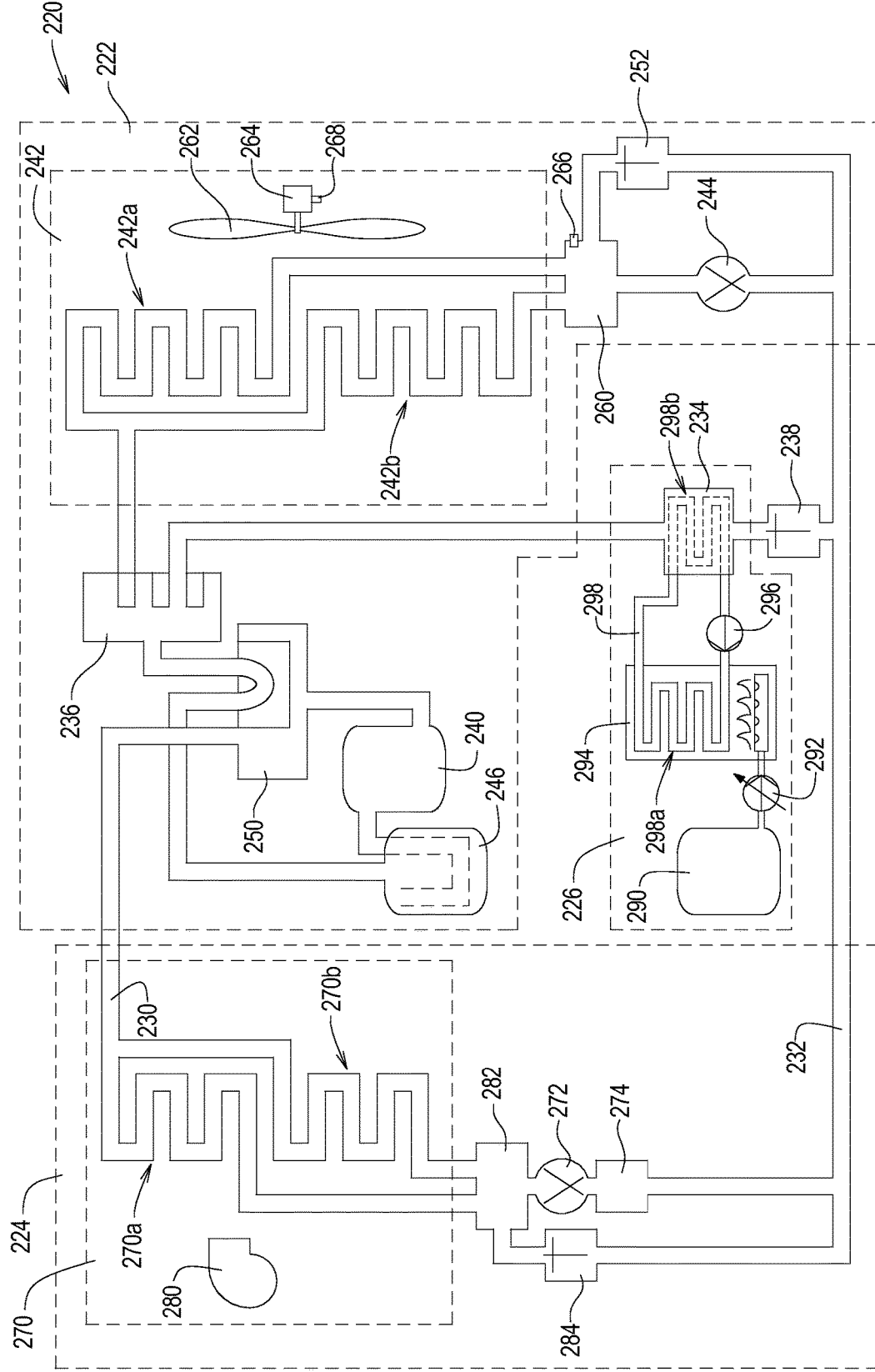
FIG. 3B is a schematic view of the third example vehicle heating and cooling system of the present invention in a second mode.

Referring now to FIGS. 3A and 3B of the drawing, depicted therein is a third example vehicle heating and cooling system 220 of the present invention. The third example vehicle heating and cooling system 220 is capable of operating in a cooling mode and in a heating mode. In the cooling mode, heat is transferred from an interior A to an exterior B of a vehicle (not shown) on which the third example heating system 220 is mounted. In the heating mode, heat is transferred from the exterior B to an interior A of the vehicle on which the third example heating system 220 is mounted. As with the first example heating and cooling system 20 described above with reference to FIG. 1A, at least a portion of the power consumed by a battery (not shown) of the vehicle system associated with the third example heating and cooling system 220.

The third example vehicle heating and cooling system 220 comprises a compressor system 222, an interior system 224, and an auxiliary system 226. The compressor system 222 and the interior system 224 are connected together by a first main line 230 and a second main line 232. The first and second main lines 230 and 232 allow main working fluid to be circulated between the compressor system 222 and the interior system 224. The compressor system 222 and the auxiliary heating system 226 are connected together by an auxiliary heat exchanger 234 that allows heat generated by the auxiliary heating system 226 to be transferred to the main working fluid. A control valve 236 and check valve 238 allow the third example heating and cooling system 220 to be placed in a main heating mode or an auxiliary heating mode as will be described in further detail below.

The compressor system 222 comprises a compressor 240, a compressor heat exchanger 242, a compressor thermal expansion valve 244, and an accumulator 246. The example compressor heat exchange 242 comprises a plurality of heat exchanger portions 242a and 242b. A reversing valve 250 and compressor check valve 252 allow the third example vehicle heating and cooling system 220 to operate in the cooling mode and in the heating mode. The compressor system 222 further comprises a compressor distributor 260, a compressor fan 262, a fan motor 264, a compressor fluid temperature sensor 266, and a motor switch 268. The compressor distributor 260 allows fluid to flow through the heat exchanger portions 242a and 242b in parallel. The compressor fan 262, fan motor 264, temperature sensor 266, and motor switch 268 operate the fan 262 based on temperature of the primary working fluid flowing between the compressor system 222 and the interior system 224.

The interior system 224 comprises an interior heat exchanger 270, an interior thermal expansion valve 272, and a dryer 274. The example interior system 224 further comprises an interior blower 280, an interior distributor 282, and an interior check valve 284. The example interior heat exchanger 270 comprises a plurality of interior heat exchanger sections 270a and 270b. The interior blower 280 carries heat from the interior heat exchanger 270 into the interior A. In combination with the reversing valve 250 and compressor check valve 252, the interior distributor 282 and interior check valve 284 allow the third example vehicle heating and cooling system 220 to operate in the cooling mode and in the heating mode. The interior distributor 282 allows fluid to flow through the interior heat exchanger portions 270a and 270b in parallel.

In the cooling mode, the compressor system 222 and the interior system 224 operate in a conventional manner as generally described in the U.S. Pat. No. 6,615,602 patent. The operation of the third example heating and cooling system 220 in the cooling mode will thus not be described in detail herein.

In the heating mode, the third example heating and cooling system 220 may operate in both a standard heating mode and in an auxiliary heating mode. In the standard heating mode, the compressor system 222 and the interior system 224 operate in a conventional manner as generally described in the U.S. Pat. No. 6,615,602 patent. In the augmented heating mode, the auxiliary heating system 226 is used instead of the compressor system 222 to transfer heat to the interior system 224 as will now be described in detail.

In particular, the example auxiliary heating system 226 comprises a fuel tank 290, a fuel control valve 292, a boiler 294, an auxiliary fuel pump 296, and an auxiliary fluid line 298. The auxiliary fluid line 298 comprises a boiler section 298a and a heat exchanger section 298b. The boiler section 298a is located within the boiler 294, and the heat exchanger section 298b is located within the auxiliary heat exchanger 234.

The fuel tank 290 may be the main fuel tank of the vehicle on which the third example heating and cooling system 220 is mounted (e.g., diesel, gasoline) or may be a separate, auxiliary fuel tank containing the same or another type of fuel (e.g., propane). The fuel control valve 292 controls the flow of fuel from the fuel tank 290 to the boiler 294. The boiler 294 burns the fuel to create heat.

The auxiliary fuel pump 296 circulates auxiliary fluid (e.g., water) through the burner section 298a and the heat exchanger section 298b of the auxiliary fluid line 298. Heat from the boiler 294 is transferred to the auxiliary fluid in the boiler section 298a. Heat from the auxiliary fluid is transferred to the main fluid in the auxiliary heat exchanger 234. The control valve 236 and check valve 238 allow the auxiliary heating system 226 to be arranged in parallel with the compressor system 222 and thus may be used instead of the compressor system 222. The auxiliary heating system 226 thus may be used to transfer heat to the main fluid when environmental and vehicle operation considerations do not allow the compressor system 222 efficiently to extract sufficient heat from the ambient air flowing across the compressor heat exchanger 242.

IV. Fourth Example Heating and Cooling System

Figure 4A:
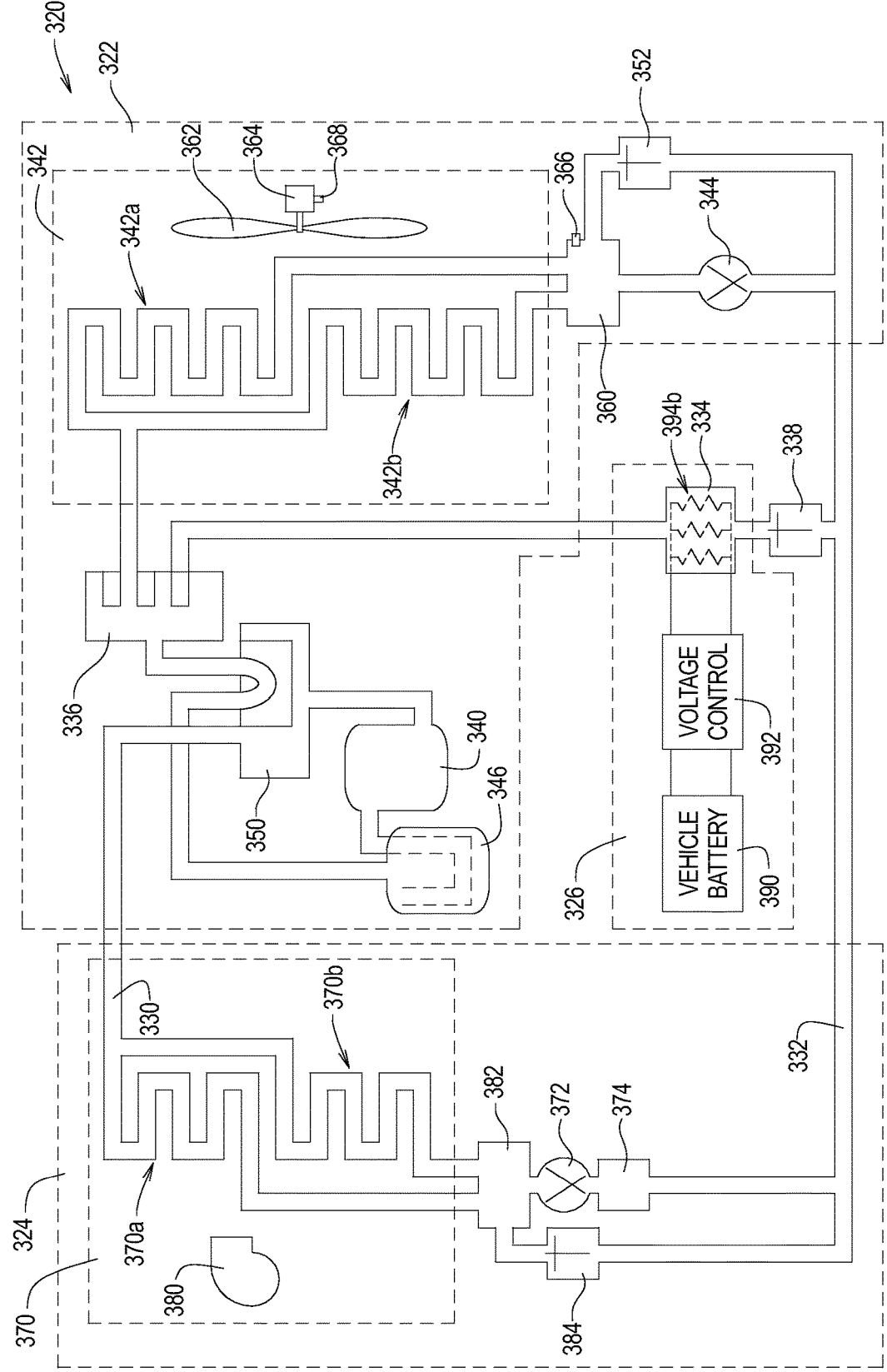
FIG. 4A is a schematic view of a fourth example vehicle heating and cooling system of the present invention in a first mode.

Referring now to FIGS. 4A and 4B of the drawing, depicted therein is a fourth example vehicle heating and cooling system 320 of the present invention. The fourth example vehicle heating and cooling system 320 is capable of operating in a cooling mode and in a heating mode. In the cooling mode, heat is transferred from an interior A to an exterior B of a vehicle (not shown) on which the fourth example heating system 320 is mounted. In the heating mode, heat is transferred from the exterior B to an interior A of the vehicle on which the fourth example heating system 320 is mounted. As with the first example heating and cooling system 20 described above with reference to FIG. 1A, at least a portion of the power consumed by a battery (not shown) of the vehicle system associated with the fourth example heating and cooling system 220.

The fourth example vehicle heating and cooling system 320 comprises a compressor system 322, an interior system 324, and an auxiliary system 326. The compressor system 322 and the interior system 324 are connected together by a first main line 330 and a second main line 332. The first and second main lines 330 and 332 allow main working fluid to be circulated between the compressor system 322 and the interior system 324. The compressor system 322 and the auxiliary heating system 326 are connected together by an auxiliary heat exchanger 334 that allows heat generated by the auxiliary heating system 326 to be transferred to the main working fluid. A control valve 336 and check valve 338 allow the fourth example heating and cooling system 320 to be placed in a main heating mode or an auxiliary heating mode as will be described in further detail below.

The compressor system 322 comprises a compressor 340, a compressor heat exchanger 342, a compressor thermal expansion valve 344, and an accumulator 346. The example compressor heat exchange 342 comprises a plurality of heat exchanger portions 342a and 342b. A reversing valve 350 and compressor check valve 352 allow the fourth example vehicle heating and cooling system 320 to operate in the cooling mode and in the heating mode. The compressor system 322 further comprises a compressor distributor 360, a compressor fan 362, a fan motor 364, a compressor fluid temperature sensor 366, and a motor switch 368. The compressor distributor 360 allows fluid to flow through the heat exchanger portions 342a and 342b in parallel. The compressor fan 362, fan motor 364, temperature sensor 366, and motor switch 368 operate the fan 362 based on temperature of the primary working fluid flowing between the compressor system 322 and the interior system 324.

The interior system 324 comprises an interior heat exchanger 370, an interior thermal expansion valve 372, and a dryer 374. The example interior system 324 further comprises an interior blower 380, an interior distributor 382, and an interior check valve 384. The example interior heat exchanger 370 comprises a plurality of interior heat exchanger sections 370a and 370b. The interior blower 380 carries heat from the interior heat exchanger 370 into the interior A. In combination with the reversing valve 350 and compressor check valve 352, the interior distributor 382 and interior check valve 384 allow the fourth example vehicle heating and cooling system 320 to operate in the cooling mode and in the heating mode. The interior distributor 382 allows fluid to flow through the interior heat exchanger portions 370a and 370b in parallel.

In the cooling mode, the compressor system 322 and the interior system 324 operate in a conventional manner as generally described in the U.S. Pat. No. 6,615,602 patent, which is incorporated herein by reference. The operation of the fourth example heating and cooling system 320 in the cooling mode will thus not be described in detail herein.

In the heating mode, the fourth example heating and cooling system 320 may operate in both a standard heating mode and in an auxiliary heating mode. In the standard heating mode, the compressor system 322 and the interior system 324 operate in a conventional manner as generally described in the U.S. Pat. No. 6,615,602 patent. In the augmented heating mode, the auxiliary heating system 326 is used instead of the compressor system 322 to transfer heat to the interior system 324 as will now be described in detail.

In particular, the example auxiliary heating system 326 comprises a battery 390, a voltage controller 392, and heating elements 394. The heating elements 394 are arranged within the auxiliary heat exchanger 334.

The battery 390 may be the main battery of the vehicle on which the fourth example heating and cooling system 320 is mounted or may be a separate, auxiliary battery dedicated for use with the auxiliary heating system 326.

The voltage controller 392 controls the flow of electricity from the battery 390 to the heating elements 394. The heating elements 394 are resistive elements that convert electricity into heat. Heat from the heating elements 394 is transferred to the main fluid in the auxiliary heat exchanger 334. The control valve 336 and check valve 338 allow the auxiliary heating system 326 to be arranged in parallel with the compressor system 322 and thus may be used instead of the compressor system 322. The auxiliary heating system 326 thus may be used to transfer heat to the main fluid when environmental and vehicle operation considerations do not allow the compressor system 322 efficiently to extract sufficient heat from the ambient air flowing across the compressor heat exchanger 342.

What is claimed is:

1. A vehicle heating and cooling system for a vehicle comprising a vehicle battery, the vehicle heating and cooling system comprising:
   an interior system;
   a compressor system;
   a primary working fluid configured to flow between the interior system and the compressor system;
   an auxiliary heating system comprising
   an auxiliary heat exchanger comprising at least one resistive-type heating element, where the auxiliary heat exchanger is operatively configured to transfer heat to the primary working fluid, and
   a voltage controller operatively connected between the vehicle battery and the at least one resistive-type heating element to control flow of electricity from the battery to the at least one resistive-type heating element to generate heat; and
   at least one valve assembly configured to operate in
   a cooling mode in which the primary working fluid transfers heat from the interior system to the compressor system,
   a standard heating mode in which in which the primary working fluid transfers heat from the compressor system to the interior system and the auxiliary heating system does not transfer heat to the primary working fluid, and
   an augmented heating mode in which the auxiliary heating system transfers heat from the at least one resistive-type heating element to the primary working fluid.

2. The vehicle heating and cooling system as recited in claim 1, in which the primary working fluid transfers heat from the compressor system to the interior system when the at least one valve assembly is in the augmented heating mode.

3. The vehicle heating and cooling system as recited in claim 1, in which the vehicle battery comprises at least one of a main battery and an auxiliary battery.

4. The vehicle heating and cooling system as recited in claim 3, in which the auxiliary battery is dedicated for use with the auxiliary heating system.

5. The vehicle heating and cooling system as recited in claim 1, in which the vehicle battery comprises an auxiliary battery.

6. The vehicle heating and cooling system as recited in claim 5, in which the auxiliary battery is dedicated for use with the auxiliary heating system.

7. A vehicle heating and cooling system for a vehicle comprising a vehicle battery, the vehicle heating and cooling system comprising:
   an interior system comprising an evaporator;
   a compressor system comprising a compressor and a condenser;
   a primary working fluid configured to flow between the evaporator and the compressor;
   an auxiliary heating system comprising
   an auxiliary heat exchanger comprising at least one resistive-type heating element, where the auxiliary heat exchanger is operatively configured to transfer heat to the primary working fluid, and
   a voltage controller operatively connected between the vehicle battery and the at least one resistive-type heating element to control flow of electricity from the battery to the at least one resistive-type heating element to generate heat; and
   at least one valve assembly configured to operate in
   a cooling mode in which the primary working fluid transfers heat from the interior system to the compressor system,
   a standard heating mode in which in which the primary working fluid transfers heat from the compressor system to the interior system and the auxiliary heating system does not transfer heat to the primary working fluid, and an augmented heating mode in which the auxiliary heating system transfers heat from the at least one resistive-type heating element to the primary working fluid.

8. The vehicle heating and cooling system as recited in claim 7, in which the primary working fluid transfers heat from the compressor system to the interior system when the at least one valve assembly is in the augmented heating mode.

9. The vehicle heating and cooling system as recited in claim 7, in which the vehicle battery comprises at least one of a main battery and an auxiliary battery.

10. The vehicle heating and cooling system as recited in claim 9, in which the auxiliary battery is dedicated for use with the auxiliary heating system.

11. The vehicle heating and cooling system as recited in claim 7, in which the vehicle battery comprises an auxiliary battery.

12. The vehicle heating and cooling system as recited in claim 11, in which the auxiliary battery is dedicated for use with the auxiliary heating system.

\* \* \* \* \*